(12) United States Patent
Godfrey et al.

(10) Patent No.: US 7,416,242 B2
(45) Date of Patent: Aug. 26, 2008

(54) REINFORCEMENT PLATE

(75) Inventors: Peter R. Godfrey, Northville, MI (US);
Prashenjit Pal, Fairfield, OH (US);
Gursharn Sanghera, Windsor (CA);
Henry Jon Ziaja, Dearborn, MI (US)

(73) Assignee: Chrysler LLC, Auburn Hills, MI (US)

( * ) Notice: Subject to any disclaimer, the term of this patent is extended or adjusted under 35 U.S.C. 154(b) by 106 days.

(21) Appl. No.: 11/391,863

(22) Filed: Mar. 29, 2006

(65) Prior Publication Data

US 2007/0228775 A1   Oct. 4, 2007

(51) Int. Cl.
*B62D 25/20* (2006.01)
(52) U.S. Cl. .................. 296/187.08; 296/193.07; 296/30; 296/35.1
(58) Field of Classification Search .......... 296/187.08, 296/187.12, 193.07, 203.03, 30, 29, 35.1
See application file for complete search history.

(56) References Cited

U.S. PATENT DOCUMENTS

| | | | | |
|---|---|---|---|---|
| 4,892,350 | A * | 1/1990 | Kijima | 296/204 |
| 5,303,973 | A | 4/1994 | Fujii | |
| 5,567,005 | A * | 10/1996 | Kosuge et al. | 296/204 |
| 5,660,426 | A | 8/1997 | Sugimori et al. | |
| 6,273,486 | B1 * | 8/2001 | Ezzat et al. | 296/29 |
| 6,361,102 | B1 * | 3/2002 | Han | 296/203.02 |
| 6,547,318 | B2 * | 4/2003 | Takeuchi | 296/204 |
| 6,616,217 | B1 * | 9/2003 | Robinson | 296/178 |
| 2005/0140179 | A1 | 6/2005 | Morsch et al. | |
| 2005/0248185 | A1 * | 11/2005 | Hayashi | 296/193.07 |
| 2006/0197361 | A1 * | 9/2006 | Ito et al. | 296/193.07 |
| 2007/0063543 | A1 * | 3/2007 | Roccato et al. | 296/187.08 |

* cited by examiner

*Primary Examiner*—Jason S Morrow
(74) *Attorney, Agent, or Firm*—Alexander Zelikov

(57) ABSTRACT

A reinforcement plate for a floor pan of a front foot well of an automotive vehicle. The reinforcement plate has impact resistant surfaces for reinforcing the floor pan against impacts in two and preferably three different directions.

9 Claims, 4 Drawing Sheets

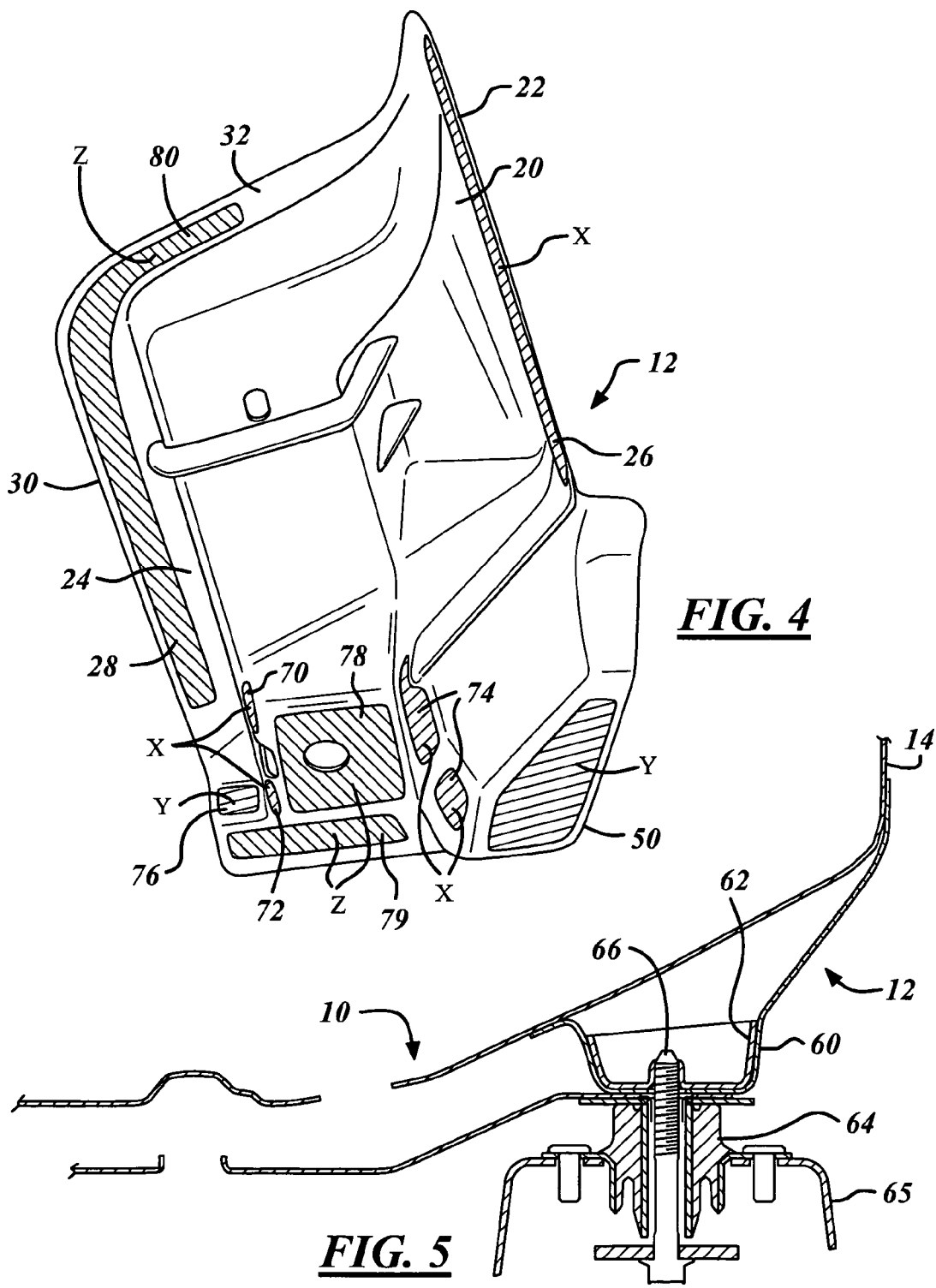

US 7,416,242 B2

REINFORCEMENT PLATE

FIELD OF THE INVENTION

The present invention relates generally to a floor pan in a front foot well of an automotive vehicle, and more particularly to a reinforcement for the floor pan.

BACKGROUND OF THE INVENTION

Typically, there is a floor pan in the front foot well of an automotive vehicle. The floor pan can be crushed by a 90° impact coming from the side of the vehicle or by an acute angle impact. There is a need for the floor pan to be reinforced to prevent it from being crushed on impact and also to reduce, if not eliminate, noise, vibration and harshness often experienced under normal driving conditions.

SUMMARY OF THE INVENTION

In accordance with the present invention, the floor pan is reinforced by a reinforcement plate. The reinforcement plate is adapted to be secured to the floor pan and protects the floor pan from crushing impact in at least two and preferably three directions. This is accomplished by portions of the reinforcement plate which preferably are disposed perpendicular to one another. The reinforcement plate also adds stiffness to the floor pan. A mounting assembly mounts the reinforcement plate preferably on rigid vehicle support structure such as a chassis frame member of the vehicle.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein:

FIG. 4 is a detail view in perspective of the underside of the reinforcement plate;

FIG. 5 is a sectional view taken on the line 5-5 in FIG. 2;

DETAILED DESCRIPTION OF THE PREFERRED EMBODIMENT

Figure 1:
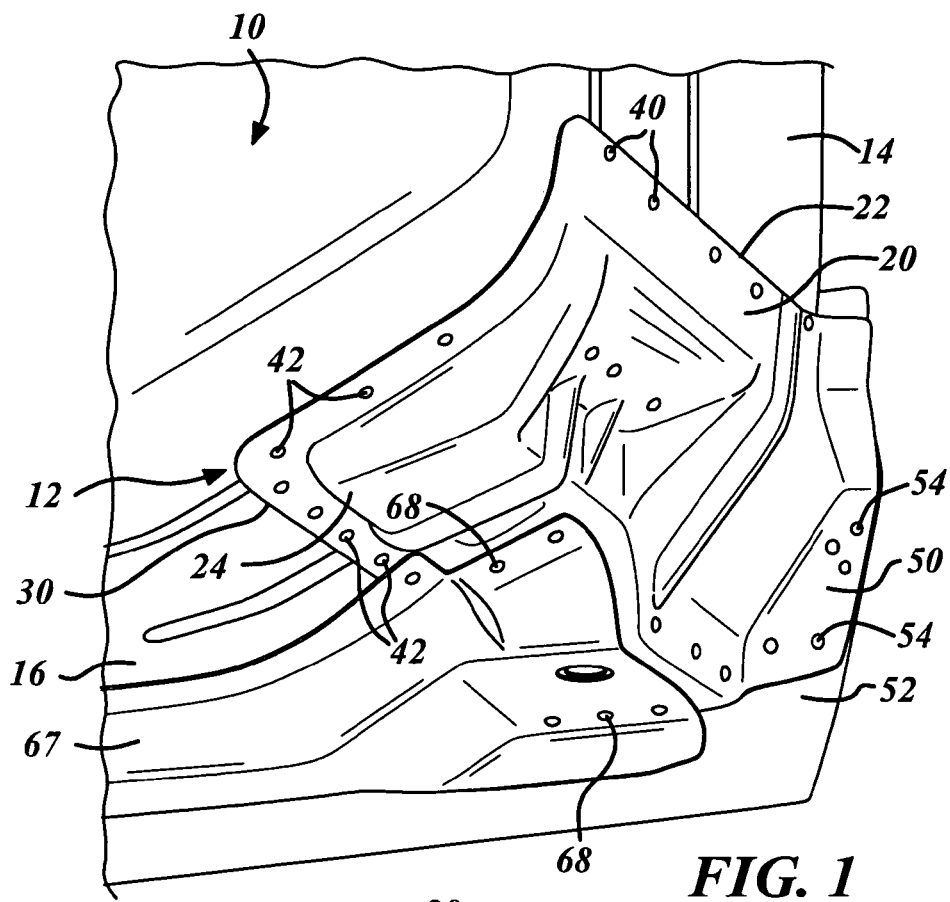
FIG. 1 is a fragmentary perspective view of the reinforcement plate secured to the underside of the floor pan, in accordance with the invention.
Figure 2:
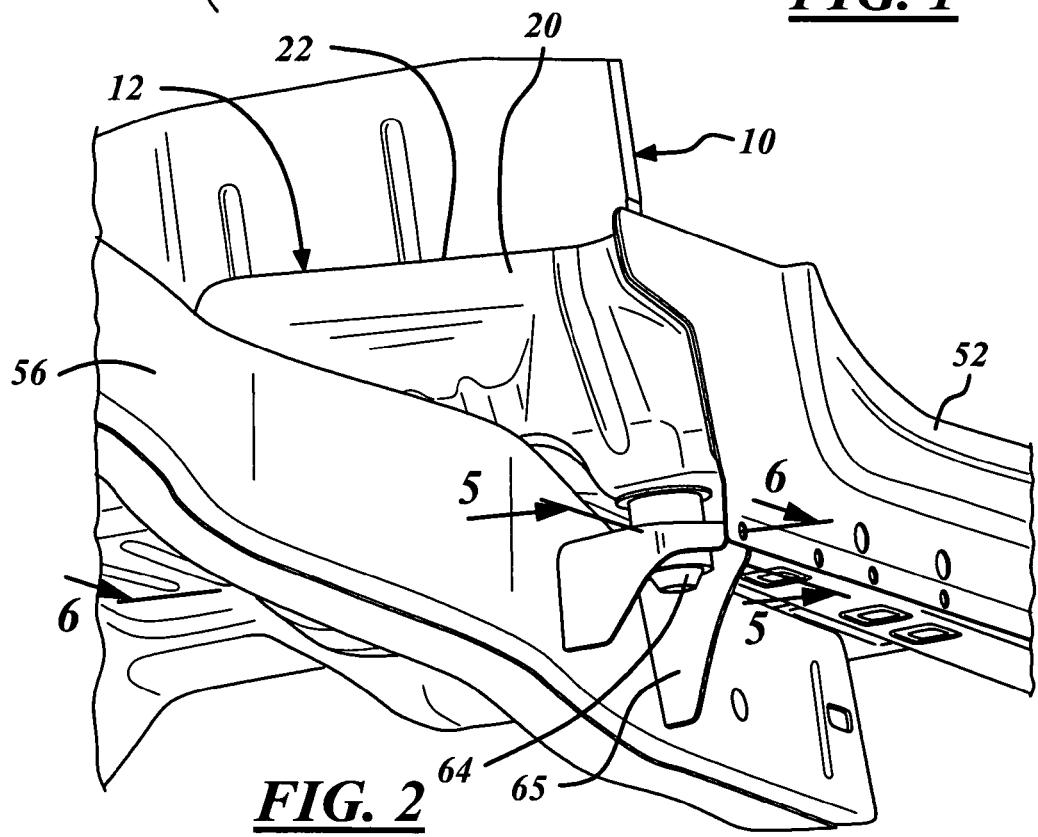
FIG. 2 is a fragmentary perspective view showing the parts in FIG. 1 from a different angle.
Figure 3:
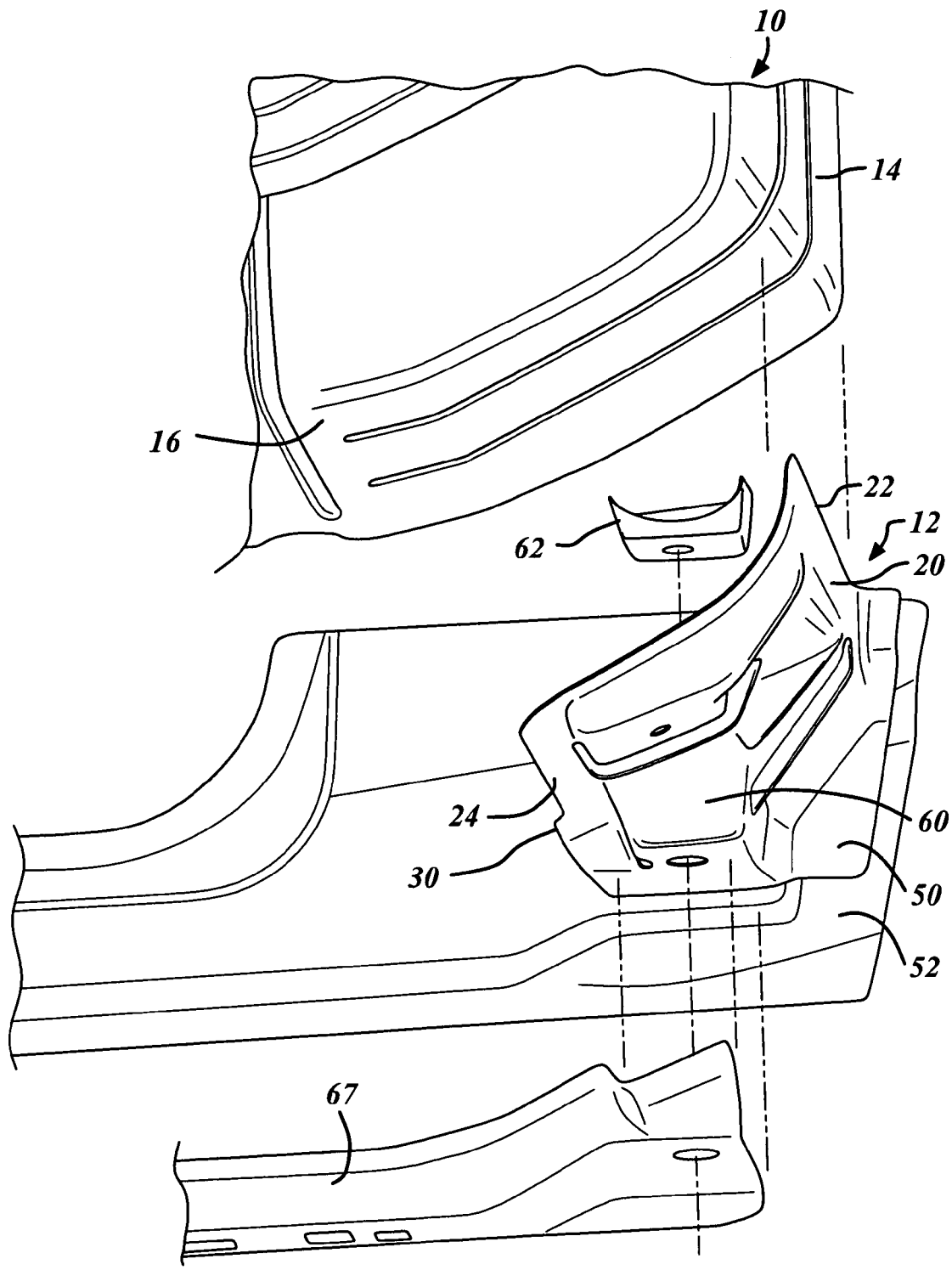
FIG. 3 is an enlarged exploded view of the parts shown in FIG. 1.
Figure 6:
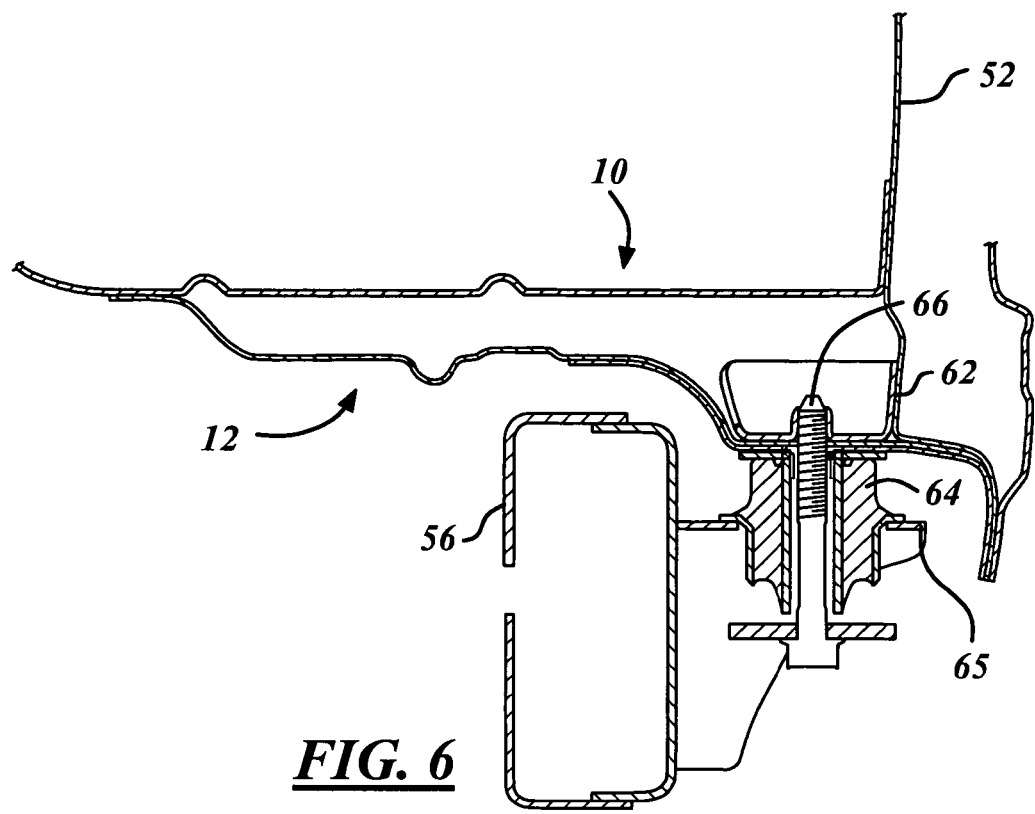
FIG. 6 is a sectional view taken on the line 6-6 in FIG. 2.
Figure 7:
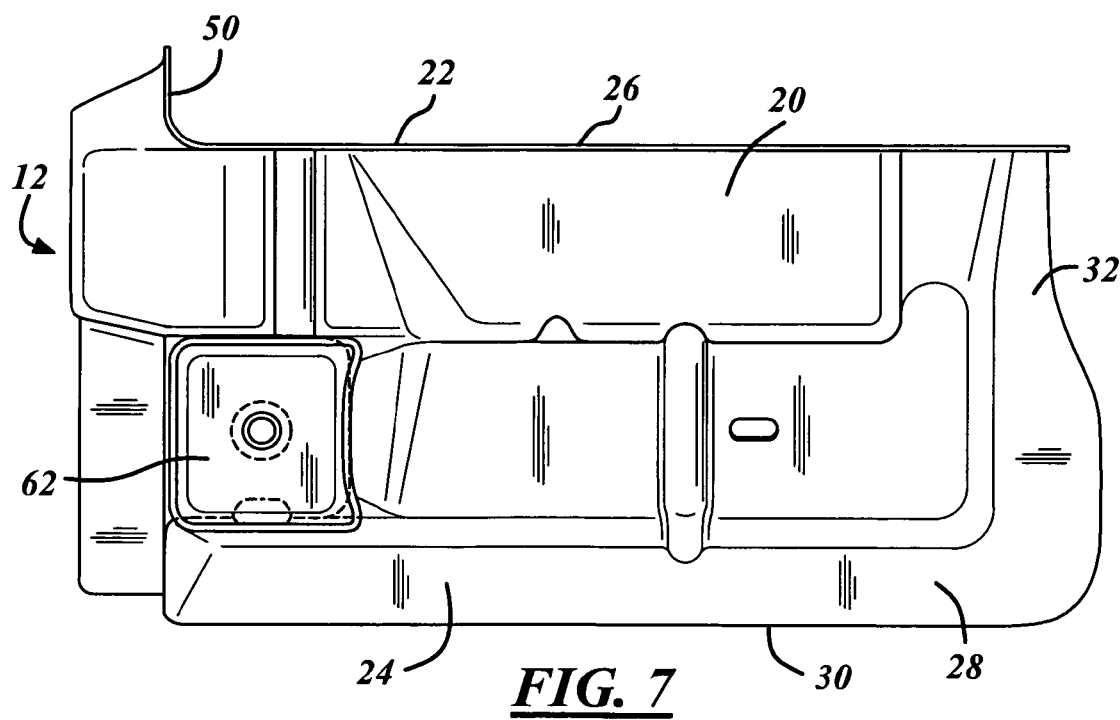
FIG. 7 is a plan view of the reinforcement plate as viewed from above.

The following description of the preferred embodiment is merely exemplary in nature and is in no way intended to limit the invention, its application, or uses.

Referring now more particularly to the drawings, there is shown a floor pan 10 reinforced by a reinforcement plate 12. The floor pan 10 is located in a foot well of an automotive vehicle in front of the driver's seat. The reinforcement plate is beneath the floor pan and is secured to the undersurface thereof. A similar floor pan and reinforcement plate may be provided in front of a passenger seated next to the driver.

The floor pan 10 has an upright front portion 14 which extends vertically downward, and then curves rearwardly to provide a generally horizontal bottom portion 16.

The configuration of the reinforcement plate 12 is generally similar to the configuration of the floor pan 10, following the general contour thereof. Thus the reinforcement plate has an upright front portion 20 which extends vertically downward from the top edge 22, and then curves rearwardly to provide a generally horizontal bottom portion 24. The reinforcement plate 12 has a flat vertical top rim 26 across the top edge 22. The reinforcement plate 12 also has a flat horizontal rear rim 28 across the rear edge 30, and a side rim 32 extending from an end of the top rim 26 to an end of the rear rim 28.

Fasteners 40 which may be simple spot welds, secure the vertical top rim 26 to the upright front portion 14 of the floor pan 10 in a surface-to-surface relationship. Similar spot welds 42 secure the horizontal rear rim 28 to the horizontal bottom portion 16 of the floor pan. The spot welds 42 continue along the side rim 32 to secure the side edge portion of the reinforcement plate 12 to the overlying floor pan 10.

The vertical top rim 26 is disposed in a flat vertical plane designated X in FIG. 4, and the horizontal rear rim 28, as well as a portion of the side rim 32, is disposed in a flat horizontal plane designated Z in FIG. 4. The planes X and Z are perpendicular to one another.

The reinforcement plate 12 has a flat lateral flange 50 along one side. The lateral flange 50 is disposed in a flat lateral plane designated Y in FIG. 4. The plane Y is perpendicular to both of the planes X and Z. The flange 50 is secured to rigid vehicle frame structure, specifically a side sill 52, in a surface-to-surface relationship, by fasteners such as the spot welds 54.

The reinforcement plate 12 is mounted on a chassis frame member 56 of the vehicle frame structure. To accomplish this, the reinforcement plate 12 has an upwardly opening cup-shaped formation providing a receptacle 60. A clamping plate 62 fits down into the receptacle. A body mount 64 carried by a bracket 65 on the chassis frame member 56 supports a screw 66 which threads into the clamping plate 62 through a hole in the bottom of the receptacle to clamp the clamping plate 12 to the bracket.

Rigid vehicle frame structure, specifically an underbody hold-down 67, is secured to the bottom of the receptacle 60 in a surface-to-surface relationship and similarly to other portions of the reinforcement plate 12 by fasteners such as the welds 68.

It will be noted in FIG. 4 that there are other areas 70, 72 and 74 of the reinforcement plate 12 which are in planes marked X and hence are parallel to the vertical plane of the vertical top rim 26. There is another area 76 of the reinforcement plate 12 which is marked Y and hence is parallel to the plane of the flange 50. There are other areas 78, 79 and 80 marked Z and hence are parallel to the horizontal plane of the horizontal rear rim 28.

All of the areas of the reinforcement plate 12 marked X are in generally vertical planes and reinforce the floor pan 10 against frontal or rear impacts. All of the areas of the reinforcement plate 12 marked Y are in generally lateral planes and reinforce the floor pan 10 against side impacts. All of the areas of the reinforcement plate marked Z are in generally horizontal planes and reinforce the floor pan 10 against vertical impacts. The three planes X, Y and Z are perpendicular to one another and thus reinforce the floor pan 10 in three directions. The reinforcement also eliminates, or at least substantially reduces noise vibration and harshness.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A reinforcement for a floor pan of a front foot well of an automotive vehicle, wherein the floor pan has a generally upright floor pan portion, comprising:
    a reinforcement plate having a generally upright plate portion secured to the generally upright floor pan portion of the floor pan to reinforce the floor pan against a frontal impact,
    said reinforcement plate having a lateral plate portion extending substantially perpendicular to said generally upright plate portion and an upwardly opening cup-shaped formation providing a receptacle, and
    rigid vehicle support structure having a rigid chassis frame member of the vehicle, and a mounting assembly mounting said reinforcement plate on said rigid chassis frame member having a clamping plate in said receptacle, and a fastener clamping said clamping plate to a bracket on said rigid chassis frame member,
    said lateral plate portion being secured to the vehicle support structure to reinforce the floor pan against a lateral impact.

2. The reinforcement of claim 1, wherein the floor pan has a generally horizontal floor pan portion, said reinforcement plate has a generally horizontal plate portion extending substantially perpendicular to said generally upright plate portion and to said lateral plate portion, and said substantially horizontal plate portion is secured to said substantially horizontal floor pan portion to reinforce the floor pan against a vertical impact.

3. The reinforcement of claim 1, wherein said lateral plate portion comprises a flange of said reinforcement plate.

4. The reinforcement of claim 1, wherein said generally upright plate portion of said reinforcement plate comprises a marginal generally upright rim of said reinforcement plate.

5. The reinforcement plate of claim 2, wherein said generally horizontal plate portion of said reinforcement plate comprises a generally horizontal rim of the reinforcement plate.

6. The reinforcement of claim 2, wherein said lateral plate portion of said reinforcement plate comprises a flange of said reinforcement plate, said generally upright plate portion of said reinforcement plate comprises a marginal generally upright rim of said reinforcement plate, and said generally horizontal plate portion of said reinforcement plate comprises a generally horizontal rim of the reinforcement plate.

7. A reinforcement for a floor pan of a front foot well of an automotive vehicle, comprising:
    a reinforcement plate adapted to be secured to the floor pan in an operative position,
    a mounting assembly for mounting said reinforcement late on rigid frame structure of the vehicle in said operative position,
    said reinforcement plate having a cup-shaped formation providing a receptacle, said mounting assembly includes a clamping plate in said receptacle, and a fastener for clamping said clamping plate to a bracket on the rigid frame structure of the vehicle,
    said reinforcement plate having a first plate portion for reinforcing the floor pan against a frontal impact,
    said reinforcement plate having a second plate portion for reinforcing the floor pan against a lateral impact,
    said first and second plate portions extending substantially perpendicular to one another.

8. The reinforcement of claim 7, wherein the reinforcement plate has a third plate portion for reinforcing the floor pan against a vertical impact, said third plate portion extending substantially perpendicular to said first and second plate portions.

9. The reinforcement of claim 8, wherein said first plate portion comprises a first rim of said reinforcement plate, said second plate portion comprises a flange of the reinforcement plate, and the third plate portion comprises another rim of the reinforcement plate.

* * * * *